United States Patent
Wagner

(10) Patent No.: US 10,824,057 B2
(45) Date of Patent: Nov. 3, 2020

(54) STRAP RETAINER FOR A CAMERA

(71) Applicant: SWIFT DESIGN GMBH, Hamburg (DE)

(72) Inventor: Gert Wagner, Tetenbull (DE)

(73) Assignee: Swift Design GMBH, Hamburg (DE)

(*) Notice: Subject to any disclaimer, the term of this patent is extended or adjusted under 35 U.S.C. 154(b) by 0 days.

(21) Appl. No.: 16/304,534

(22) PCT Filed: May 26, 2017

(86) PCT No.: PCT/DE2017/100451
§ 371 (c)(1),
(2) Date: Nov. 26, 2018

(87) PCT Pub. No.: WO2017/202423
PCT Pub. Date: Nov. 30, 2017

(65) Prior Publication Data
US 2019/0278159 A1    Sep. 12, 2019

(30) Foreign Application Priority Data

May 27, 2016 (DE) .................. 20 2016 102 830 U

(51) Int. Cl.
| | |
|---|---|
| G03B 7/00 | (2014.01) |
| G03B 17/56 | (2006.01) |
| F16M 13/04 | (2006.01) |
| F16M 13/00 | (2006.01) |
| F16M 11/20 | (2006.01) |
| F16M 11/10 | (2006.01) |

(52) U.S. Cl.
CPC ........... *G03B 17/566* (2013.01); *F16M 11/10* (2013.01); *F16M 11/2021* (2013.01); *F16M 13/00* (2013.01); *F16M 13/04* (2013.01); *G03B 17/561* (2013.01); *G03B 17/563* (2013.01)

(58) Field of Classification Search
USPC ........................................................ 396/419
See application file for complete search history.

(56) References Cited

U.S. PATENT DOCUMENTS

| | | | | |
|---|---|---|---|---|
| 4,666,158 | A * | 5/1987 | Moro ................. | A63B 69/0046 473/62 |
| 4,953,766 | A * | 9/1990 | Cruickshank ............ | A42B 1/24 2/422 |
| 5,954,678 | A | 9/1999 | Cruz | |
| 6,899,255 | B2 * | 5/2005 | Pringle ..................... | A45F 5/00 224/219 |
| D592,235 | S * | 5/2009 | Bryant ....................... | D16/243 |

(Continued)

OTHER PUBLICATIONS

Brindley, Mike., "12 Best GoPro Accessories 2015-2016—Whitelines Sno . . . ", https://whitelines.com/snowboard-gear/reviews/best-buys/gopro-accessories.html, Oct. 14, 2015.

(Continued)

*Primary Examiner* — Rodney E Fuller
(74) *Attorney, Agent, or Firm* — Diederiks & Whitelawm PLC.

(57) ABSTRACT

A strap retainer for a camera, comprises a first section, which has a first strap feed-through and a second strap feed-through and a fastening device for fastening the camera to the strap retainer. A second section is articulated to the first section and has a third strap feed-through and a fourth feed-through.

8 Claims, 1 Drawing Sheet

(56) References Cited

U.S. PATENT DOCUMENTS

| | | | | |
|---|---|---|---|---|
| 8,517,965 B2* | 8/2013 | Doty | ............... | A61F 5/0123 |
| | | | | 128/846 |
| 9,554,639 B1* | 1/2017 | Harden | ............... | F16M 11/041 |
| 9,612,506 B1* | 4/2017 | Webb | ............... | G03B 17/561 |
| 2008/0030013 A1* | 2/2008 | Burghardt | ............... | B60R 22/26 |
| | | | | 280/808 |
| 2010/0316369 A1* | 12/2010 | Pyle | ............... | G03B 17/00 |
| | | | | 396/423 |
| 2013/0004153 A1* | 1/2013 | McKee | ............... | F16M 11/041 |
| | | | | 396/420 |
| 2013/0170823 A1* | 7/2013 | McDonald | ............... | G03B 17/565 |
| | | | | 396/428 |
| 2014/0066218 A1 | 3/2014 | Jun | | |
| 2014/0252188 A1* | 9/2014 | Webster | ............... | F16M 13/022 |
| | | | | 248/229.17 |
| 2015/0105709 A1* | 4/2015 | Pegg | ............... | A61F 5/013 |
| | | | | 602/12 |
| 2015/0323858 A1* | 11/2015 | Stephens | ............... | F16M 13/04 |
| | | | | 396/423 |
| 2016/0131963 A1* | 5/2016 | Clearman | ............... | G03B 17/561 |
| | | | | 224/267 |
| 2016/0174674 A1* | 6/2016 | Oberpriller | ............... | A45F 5/021 |
| | | | | 224/222 |
| 2017/0274249 A1* | 9/2017 | Moebius | ............... | A63B 21/00845 |
| 2018/0198968 A1* | 7/2018 | Heine | ............... | G03B 17/561 |
| 2019/0151588 A1* | 5/2019 | Jeffrey | ............... | A61M 16/0465 |

OTHER PUBLICATIONS

Screenshots and transcripts from GoPro Tutorials: "GoPro Introducing The Strap", *YouTube*, https://www.youtube.com/watch?v=mdigZJL7hMQ, Jul. 6, 2015.

\* cited by examiner

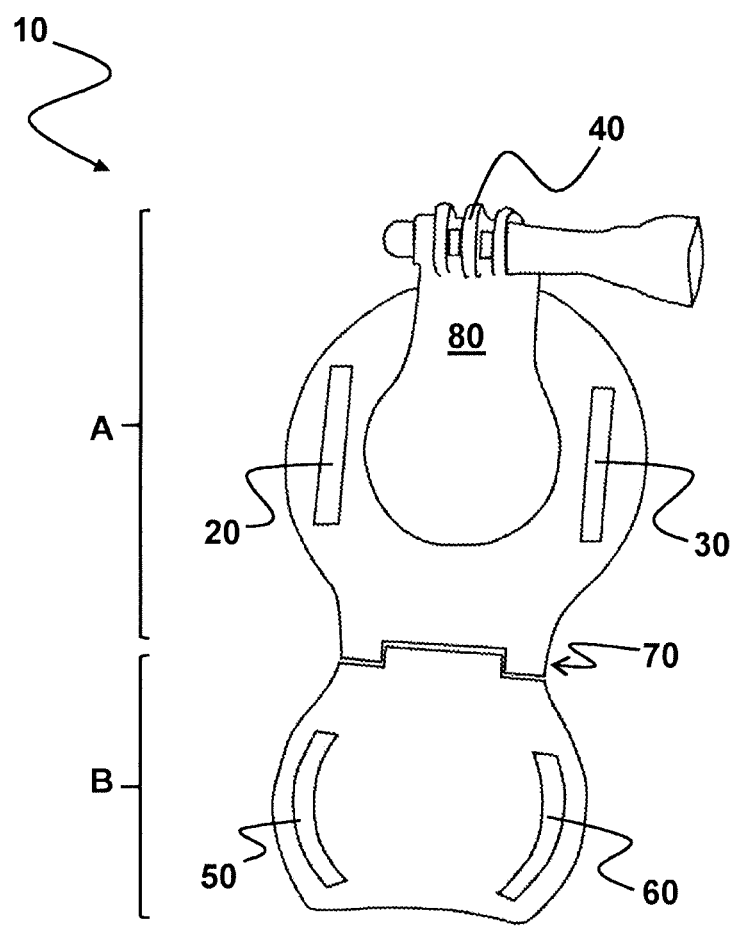

STRAP RETAINER FOR A CAMERA

CROSS-REFERENCE TO RELATED APPLICATIONS

This application represents the U.S. National Phase of International Application number PCT/DE2017/100451 entitled "Strap Retainer for a Camera" filed 26 May 2017, which claims priority from and the benefit of German patent application No. 20 2016 102 830.2 filed on 27 May 2016. The entire contents of these applications are incorporated herein by reference.

BACKGROUND OF THE INVENTION

The invention relates to a strap retainer for a camera, comprising a section, which has a first strap feed-through, a second strap feed-through and a fastening device for fastening the camera to the strap retainer.

Such strap retainers are known, in particular, in the sports sector for fastening so-called action cameras to the body. For example, a strap retainer to be fastened as an armband is known, via which a camera may be fastened in the area of the wrist, so that—compared to helmet cameras—the camera may be comfortably accessed and a view may still be recorded that virtually corresponds to that of the athlete, for example, of a cyclist or skier.

The disadvantage of such strap retainers which, moreover, may also be fastened to the upper arm, to the upper thigh, to the lower leg, in particular, in the area of the ankle, to the head or to various pieces of sports equipment, for example, to a bicycle, motorcycle, skateboard, surfboard, sailboat, motorboat, airplane, kite, parachute, etc., is that these offer only inadequate support, and blurred images or blurred video sequences due to the instability of the camera are the result.

The object of the invention, therefore, is to create a strap retainer, which enables a camera to be reliably and stably secured to the body, in particular, in the area of the joints, and therefore a wobble-free and distortion-free recording of images and/or videos, in particular during the performance of sporting activities.

This object is achieved according to the invention by the strap retainer having the features of claim 1. The subclaims reflect advantageous embodiments of the invention.

SUMMARY OF THE INVENTION

The basic concept of the invention is to lend the strap retainer improved stability by providing, in addition to the section fastening the camera, a section articulated to this section. As a result, the camera is fastened more securely and, in particular, video recordings become steadier.

Each half has a belt, which is tightly secured, in particular with a Velcro fastener. The strap retainer may be fastened either directly to the wrist or to the ankle—in this case—; the joint thereof adapts to the body joint and ensures the increased stability. However, even when fastening to the upper arm or on the upper thigh, the strap retainer is more stably fastened via the two belts than is possible with conventional retainers.

A short pivot arm for the camera attachment creates an additional space in relation to the body or to the piece of sports equipment, as a result of which the image distortion of the wide-angle optics of the camera is reduced. The pivot arm is, in particular, freely rotatable 360° about its axis. This results in a large selection of different camera perspectives.

Finally, it is possible to extend the pivot arm using an additional pivot arm connected to the former.

Thus, according to the present invention, a strap retainer for a camera is provided, comprising a first section, which includes a first strap feed-through, a second strap feed-through and a fastening device for fastening the camera to the strap retainer, wherein the first section is connected to a second section, which includes a third strap feed-through and a fourth strap feed-through.

In order for a stabilization of the first section to even be achieved by the second section, the joint is fitted with only one degree of freedom.

The joint is designed preferably in such a way that the axis thereof is oriented in the plane of the first section and of the second section or at least parallel to this plane. This design allows the second section to be tilted in relation to the first section. This also yields the advantage that, given proper dimensioning, the second section may be folded onto the first section and the strap retainer having small dimensions may be transported in a space-saving manner.

Thanks to this design it is, in particular, also possible to fasten the camera to the shoulder, wherein the two sections are folded down relative to one another and in any case are suitably fastened to the body.

Alternatively, the joint axis may be turned by 90° relative to the plane of the first section and of the second section, so that the second section in relation to the first section is swiveled toward the latter.

The first section is, in particular, articulated to the second section by means of a hinge. Alternatively, the first section and the second section may be integrally designed, wherein the first section and the section are connected to one another by a section that acts as a joint. This section may be featured, for example, by a soft material that has greater flexibility.

According to one preferred embodiment, it is provided that the fastening device is rotatably mounted.

The fastening device is particularly preferably fastened to an arm that extends beyond the area of the first section, wherein, as a further particularly preferred embodiment, the arm in this case is rotatably mounted on the first section. Due to the deflection of the camera beyond the first section of the strap retainer, it is possible to shift the camera to the outside the body, thereby achieving a better perspective. The disadvantage of an unfavorable shift of focus of the camera occurring in the prior art is counteracted by the improved fastening of the strap retainer to the body or to the piece of sports equipment.

The first and the second strap feed-throughs are designed, for example, as a linear slit, wherein the third and the fourth strap feed-throughs are designed, in particular, as a curved slit. The different design and/or orientation of the strap feed-throughs makes it possible to flexibly fasten the belts or bands to be fed through the strap feed-throughs, wherein the tension forces conveyed by the belts or bands and acting in different directions counteract the forces acting on the strap retainer from different directions.

At least one Velcro fastener each fastened to the first section and to the second section is preferably provided through the strap feed-throughs.

Finally, the first section and the second section are made preferably of plastic. In this way, a strap retainer is provided that is very light and comfortable to wear. Alternatively, metal and/or rubber may be used as a material.

BRIEF DESCRIPTION OF THE FIGURE

The invention is explained in greater detail with reference to a particularly preferred exemplary embodiment depicted in the single FIGURE, wherein FIG. 1 shows a perspective top view of a particularly preferably designed strap retainer according to the invention.

DETAILED DESCRIPTION OF THE PREFERRED EMBODIMENTS

The strap retainer 10 consists of a first section A and a second section B, wherein the first section A—as is known—includes two strap retainers 20, 30 situated on opposite sides of section A and a fastening device 40 for fastening a camera (not shown).

The camera fastening 40 is fastened to an arm 80 acting as a pivot arm, which is rotatably mounted on the first section and which extends over the area of the first section A in such a way that the fastening device 40, when seen from above, is situated outside the area of the first section A.

A second section B, which also includes two strap retainers 50, 60 situated on opposite sides of the second section B, is articulated to the first section A by means of a hinge 70.

By additionally providing two strap retainers, the second section B effectively prevents the first section A from turning and, at the same time, the freedom of movement of a user wearing the strap retainer 10 is maintained by providing a hinge situated between the sections A, B.

The invention claimed is:

1. A strap retainer for a camera, comprising
    a first section, which has a first strap feed-through, a second strap feed-through and a fastening device for fastening the camera to the strap retainer and
    a second section, which is articulated to the first section, and which has a third strap feed-through and a fourth strap feed-through, wherein the first section is articulated to the second section by a hinge, whereby the second section can be folded onto the first section.

2. The strap retainer according to claim 1, wherein the fastening device is rotatably mounted.

3. The strap retainer according to claim 1, wherein the fastening device is fastened to an arm, which extends beyond the area of the first section.

4. The strap retainer according to claim 3, wherein the arm is rotatably mounted on the first section.

5. The strap retainer according to claim 1, wherein the first and the second strap feed-throughs are each designed as a linear slit.

6. The strap retainer according to claim 1, wherein the third and the fourth strap feed-throughs are each designed as a curved slit.

7. The strap retainer according to claim 1, wherein the first and the second sections are made of plastic.

8. The strap retainer according to claim 1, wherein the first section is directly connected to the second section by the hinge.

\* \* \* \* \*